(12) United States Patent
Pal et al.

(10) Patent No.: US 7,386,541 B2
(45) Date of Patent: Jun. 10, 2008

(54) SYSTEM AND METHOD FOR COMPILING AN EXTENSIBLE MARKUP LANGUAGE BASED QUERY

(75) Inventors: Shankar Pal, Redmond, WA (US); Istvan Cseri, Redmond, WA (US); Oliver Seeliger, Sammamish, WA (US); Gideon Schaller, Bellevue, WA (US); Adrian Baras, Redmond, WA (US); Wei Yu, Issaquah, WA (US); Denis Churin, Sammamish, WA (US); Peter Kukol, Scottsdale, AZ (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 10/803,283

(22) Filed: Mar. 18, 2004

(65) Prior Publication Data

US 2005/0210002 A1 Sep. 22, 2005

(51) Int. Cl.
G06F 17/30 (2006.01)
G06F 7/00 (2006.01)
(52) U.S. Cl. .................. 707/3; 707/1; 707/2; 707/100; 707/101; 707/102
(58) Field of Classification Search .............. 707/1–34, 707/100–103
See application file for complete search history.

(56) References Cited

U.S. PATENT DOCUMENTS 6,836,778 B2 * 12/2004 Manikutty et al. .......... 707/102
6,917,935 B2 * 7/2005 Zwiegincew et al. .......... 707/4
2003/0101169 A1 * 5/2003 Bhatt et al. ................. 707/3
2003/0225759 A1 * 12/2003 Nonko et al. ................ 707/4
2004/0220912 A1 * 11/2004 Manikutty et al. ............ 707/3
2005/0203933 A1 * 9/2005 Chaudhuri et al. ......... 707/101

OTHER PUBLICATIONS

Hou, W.C. et al., "Statistical Estimators for Aggregate Relational Algebra Queries" *ACM Transactions on Database Systems*, Dec. 1991, 16(4), 600-654.
Klug, A., "Equivalence of Relational Algebra and Relational Calculus Query Languages Having Aggregate Functions", *Journal of the Association for Computing Machinery*, Jul. 1982, 29(3), 699-717.
Richard, P., "Evaluation of the Size of a Query Expressed in Relational Algebra", *Association for Computing Machinery*, 1981, 155-163.
Wyss, C., et al. "A Relational Algebra for Data/Metadata Integration in a Federated Database System", *CIKM*, 2001, 65-72.
Yokota, H. et al., "An Enhanced Inference Mechanism for Generating Relational Algebra Queries", *Association for Computing Machinery*, 1984, 229-238.

* cited by examiner

*Primary Examiner*—John Cottingham
*Assistant Examiner*—Susan Rayyan
(74) *Attorney, Agent, or Firm*—Woodcock Washburn LLP

(57) ABSTRACT

An extensible markup language (XML) expression included in a query is parsed to yield an abstract syntax tree. The abstract syntax tree is then transformed into a unified tree including XML algebra operations. The unified tree is then converted into a relational tree including enhanced relational algebra operations. The relational tree is then forwarded to a query processor for optimization and execution of the query at the query processor.

22 Claims, 15 Drawing Sheets (Prior Art)

(Prior Art)

Fig. 4
400

```
CREATE XML SCHEMA COLLECTION xs_people AS
'<schema xmlns="http://www.w3.org/2001/XMLSchema"
    targetNamespace="people-uri"
    xmlns:p="people-uri">
    <element name="person" maxOccurs="unbounded">
        <complexType>
            <sequence>
                <element ref="p:name" />
                <element ref="p:emailaddress" />
                <element ref="p:phone" minOccurs="0" maxOccurs="1" />
                <element ref="p:address" minOccurs="0" maxOccurs="1" />
                <element ref="p:homepage" minOccurs="0" maxOccurs="1" />
                <element ref="p:creditcard" minOccurs="0" maxOccurs="1" />
                <element ref="p:profile" minOccurs="0" maxOccurs="1" />
            </sequence>
            <attribute name="id" type="string" use="required" />
        </complexType>
    </element>
    <element name="name" type="string"/>
    <element name="emailaddress" type="anyURI" />
    <element name="phone" type="string" />
    <element name="address">
        <complexType>
            <sequence>
                <element ref="p:street" />
                <element ref="p:city" />
                <element ref="p:country" />
                <element ref="p:province" minOccurs="0" maxOccurs="1" />
                <element ref="p:zipcode" />
            </sequence>
        </complexType>
    </element>
    <element name="street" type="string" />
    <element name="city" type="normalizedString" />
    <element name="province" type="string" />
    <element name="zipcode" type="string" />
    <element name="country" type="normalizedString" />
    <element name="homepage" type="anyURI" />
    <element name="creditcard" type="string" />
    <element name="profile">
        <complexType>
            <sequence>
                <element ref="p:interest" minOccurs="0"
maxOccurs="unbounded" />
                <element ref="p:education" minOccurs="0" maxOccurs="1" />
                <element ref="p:gender" minOccurs="0" maxOccurs="1" />
                <element ref="p:business" />
                <element ref="p:age" minOccurs="0" maxOccurs="1" />
            </sequence>
            <attribute name="income" type="decimal" use="optional" />
        </complexType>
    </element>
    <element name="interest">
        <complexType>
            <attribute name="category" type="string" use="required" />
        </complexType>
    </element>
    <element name="education" type="normalizedString" />
    <element name="income" type="decimal" />
    <element name="gender" type="token" />
    <element name="business" type="string" />
    <element name="age" type="short" />
</schema>
```

```
insert into people values(1,
<person xmlns="people-uri" id="person0">
    <name>Huei Demke</name>
    <emailaddress>mailto:Demke@uu.se</emailaddress>
    <address>
        <street>95 Grinter St</street>
        <city>Macon</city>
        <country>United States</country>
        <zipcode>32</zipcode>
    </address>
    <creditcard>8182 1228 4493 3873</creditcard>
    <profile income="55386.86">
        <education>High School</education>
        <gender>male</gender>
        <business>No</business>
        <age>37</age>
    </profile>
</person>')

insert into people values(2,
<person xmlns="people-uri" id="person1">
    <name>Daishiro Juric</name>
    <emailaddress>mailto:Juric@rwth-aachen.de</emailaddress>
    <phone>+55 (692) 7209639</phone>
    <address>
        <street>5 Pinet St</street>
        <city>Athens</city>
        <country>United States</country>
        <province>Vermont</province>
        <zipcode>13</zipcode>
    </address>
    <homepage>http://www.rwth-aachen.de/~Juric</homepage>
    <creditcard>7833 6950 5399 8913</creditcard>
</person>
<person xmlns="people-uri" id="person2">
    <name>Kawon Unni</name>
    <emailaddress>mailto:Unni@llnl.gov</emailaddress>
    <phone>+59 (866) 983647</phone>
</person>')
```

Fig. 7
325b

```
[1E5A3B14]    <list>     name          [path=child::'{"people-uri"}p:name'child::'{"people-uri"}p:person']
    [1E5A3AE4]
    [1E5A3A74]            / [type=element(p{people-uri}:name,xs:string) *]        [path=child::'{"people-uri"}p:name'child::'{"people-uri"}p:person']
        [1E5A3974]          deccon [type=Integer]  value='21'
        [1E5A3944]              > [type=xs:boolean ?]
        [1E5A05F4]              coerce [type=xs:integer ?]
        [1E5A059C]              data() [type=xs:short ?]
    [1E5A3914]           name                                  [path=child::'{"people-uri"}p:person'] '{"people-uri"}p:age'
[path=child::'{"people-uri"}p:age'child::'{"people-uri"}p:profile'child::'{"people-uri"}p:person'] / [type=element(p{people-uri}:age,xs:short) ?]
        [1E5A38E4]                                           / [type=element(p{people-uri}:age,xs:short) ?]
[path=child::'{"people-uri"}p:age'child::'{"people-uri"}p:profile'child::'{"people-uri"}p:person']        [path=child::'{"people-uri"}p
    [1E5A37EC]       name           '{"people-uri"}p:profile'    [path=child::'{"people-uri"}p:profile'
uri"}p:profile'child::'{"people-uri"}p:person']               / [type=element(p{people-uri}:profile) ?]
    [1E5A38B4]                                     [type=element(p{people-uri}:person']
[path=child::'{"people-uri"}p:profile'child::'{"people-uri"}p:person']     var [type=element(p{people-uri}:person)]
    [1E5A3884]
[path=child::'{"people-uri"}p:person'] TEMP<1>
    [1E5A37BC]    [index] [type=element(p{people-uri}:person)] [/nested]
    [1E5A378C]           name                             [path=child::'{"people-uri"}p:person'] '{"people-
uri"}p:person']
    [1E5A372C]              / [type=element {...}]                                                       [path=child::'{"people-
uri"}p:person']
    [1E5A375C]    <cur.root> [type=document {...}]
    [1E5A3A44]      pred-ctx [type=element(p{people-uri}:person) *]        [path=child::'{"people-
uri"}p:person']
    [1E5A39E4]             var [type=element(p{people-uri}:person)] TEMP<1>
```

```
<XmlOp_Apply VarName="#3" Simple="Yes" >
    <XmlOp_Select VarName="%1" >
        <XmlOp_Path Path="/Child:Element(people-uri:person)" >
        </XmlOp_Path>
        <XmlOp_Compare Operator=">" >
            <XmlOp_Coerce Simple="Yes" >
                <XmlOp_Accessor Type="Value" >
                    <XmlOp_Path Path="/Child:Element(people-
uri:profile)/Child:Element(people-uri:age)" Context="%1"
ContextPath="/Child:Element(people-uri:person)" >
                    </XmlOp_Path>
                </XmlOp_Accessor>
            </XmlOp_Coerce>
            <XmlOp_Constant Value="numeric,Not
Owned,Value=(len,prec,scale)=(9,38,10)" >
            </XmlOp_Constant>
        </XmlOp_Compare>
    </XmlOp_Select>
    <XmlOp_Path Path="/Child:Element(people-uri:name)" Context="#3"
ContextPath="/Child:Element(people-uri:person)" >
    </XmlOp_Path>
</XmlOp_Apply>
```

```
LogOp_Project
  LogOp_Apply (x_jtInner)
    LogOp_Select
      LogOp_Join /* /p:person */
        LogOp_Select
          LogOp_Get TBL: xidx_people(alias TBL: person:1) xidx_people
          ScaOp_Comp x_cmpEq
            ScaOp_Identifier QCOL: [xmlalgdocidx].[dbo].[people].p_id
            ScaOp_Identifier QCOL: [person:1].pk1
        LogOp_ConstTableGet (1) [empty]
        ScaOp_Comp x_cmpEq
          ScaOp_Identifier QCOL: [person:1].hid
          ScaOp_Const
      ScaOp_Exists
        LogOp_Join
          LogOp_Select
            LogOp_Project
              LogOp_Select /* p:person/p:profile/p:age */
                LogOp_Join
                  LogOp_Select
                    LogOp_Get TBL: xidx_people(alias TBL: age:2) xidx_people
                    ScaOp_Comp x_cmpEq
                      ScaOp_Identifier QCOL: [xmlalgdocidx].[dbo].[people].p_id
                      ScaOp_Identifier QCOL: [age:2].pk1
                  LogOp_ConstTableGet (1) [empty]
                  ScaOp_Comp x_cmpEq
                    ScaOp_Identifier QCOL: [age:2].hid
                    ScaOp_Const
                  ScaOp_Logical x_lopAnd
                    ScaOp_Comp x_cmpEq
                      ScaOp_Identifier QCOL: [person:1].id
                      ScaOp_Intrinsic getancestor
                        ScaOp_Identifier QCOL: [age:2].id
                        ScaOp_Const
                    ScaOp_Comp x_cmpLe
                      ScaOp_Identifier QCOL: [person:1].id
                      ScaOp_Identifier QCOL: [age:2].id
                    ScaOp_Comp x_cmpGt
                      ScaOp_Identifier QCOL: [age:2].id
                      ScaOp_Intrinsic getdescendantlimit
                        ScaOp_Identifier QCOL: [person:1].id
```

```
AncOp_PrjList
    AncOp_PrjEl COL: Expr1010
        ScaOp_Intrinsic manufactureconstructordpath
            ScaOp_Const
            ScaOp_Identifier QCOL: [name:3].id
            ScaOp_Const
            ScaOp_Identifier QCOL: [name:3].id
        ScaOp_Comp x_cmpGt
            ScaOp_Intrinsic getdescendantlimit
                ScaOp_Identifier QCOL: [person:1].id
            ScaOp_Identifier QCOL: [name:3].id
        ScaOp_Comp x_cmpLe
            ScaOp_Identifier QCOL: [person:1].id
            ScaOp_Identifier QCOL: [name:3].id
        LogOp_ConstTableGet (1) [empty]
        ScaOp_Comp x_cmpEq
            ScaOp_Intrinsic getancestor
                ScaOp_Identifier QCOL: [person:1].id
            ScaOp_Identifier QCOL: [name:3].id
    ScaOp_Logical x_lopAnd
        ScaOp_Comp x_cmpEq
            ScaOp_Identifier QCOL: [xmlalgdocidx].[dbo].[people].p_id
            ScaOp_Identifier QCOL: [name:3].pk1
        LogOp_Get TBL: xidx_people(alias TBL: name:3) xidx_people
    LogOp_Select
LogOp_Select /* p:person/p:name */
    ScaOp_Identifier COL: Expr1007
    ScaOp_Convert sql_variant,Null,Var,ML=8016
        ScaOp_Identifier QCOL: [age:2].value
    ScaOp_Comp x_cmpGt
        ScaOp_Const
        AncOp_PrjEl COL: Expr1007
    AncOp_PrjList
    LogOp_ConstTableGet (1) [empty]
LogOp_Project
    ScaOp_Const
    ScaOp_Identifier QCOL: [age:2].value
    ScaOp_Comp x_cmpIsNot
AncOp_PrjList
```

SYSTEM AND METHOD FOR COMPILING AN EXTENSIBLE MARKUP LANGUAGE BASED QUERY

FIELD OF THE INVENTION

The present invention relates to the field of data retrieval and manipulation, and, more specifically, to compiling an extensible markup language (XML) based query.

BACKGROUND OF THE INVENTION

In conventional databases, an incoming query is typically received and manipulated by a database front end prior to being submitted to a query processor for optimization and execution. Generally, the front end uses the incoming query to generate a query plan for executing the query at the query processor. Generating an execution plan is a multi-stage process. For example, SQL Server™ from Microsoft Corp. of Redmond, Wash., is a relational database in which an execution plan may be generated as follows. First, the query may be parsed to yield an abstract syntax tree. The abstract syntax tree may then be transformed into a unified tree structure in which nodes represent abstract operations to be performed on the query. An algebrizer may then be employed to convert the unified tree operations into relational algebraic expressions in a log-op tree. The log-op tree is the resulting query plan which is submitted to the query processor for optimization and execution.

A recent development with respect to databases is that, in addition to supporting traditional relational data, the databases also support extensible markup language (XML) data. For example, SQL Server enables data to be defined using an XML data type. Columns with such an XML data type can be created in a data table, and XML variables and parameters can be declared. Such XML data can be searched, retrieved, and updated. Specifically, a query may include an XML expression written in an XML based query language such as XQuery and XSLT.

A limitation of conventional databases is that the existing method of generating a query plan set forth above is inadequate for queries that include such an XML expression. Specifically, the existing relational operations are inadequate for XML expressions that include document order and hierarchical ordering of data. Furthermore, existing algebrizers are inadequate to convert XML operations into relational algebra operations. Furthermore, existing relational algebra operations are inadequate to describe XML operations.

Thus, there is a need in the art for systems and methods for compiling an XML based query. The present invention satisfies these needs.

SUMMARY OF THE INVENTION

The present invention is directed to systems and methods for compiling an extensible markup language (XML) based query. According to the invention, a query including an XML expression is received by a database engine front end. The query is parsed by a relational query parser and embedded XML expressions are forwarded to an XML parser. The XML expression is parsed by the XML parser to yield an abstract syntax tree. The abstract syntax tree is then forwarded to an XML operation generator, which transforms the abstract syntax tree into a unified tree including XML algebra operations. The unified tree is then forwarded to an XML algebrizer, which converts the unified tree into a relational tree including enhanced relational algebra operations. The relational tree is grafted into a log-op tree being produced for the enclosed relational query. The log-op tree results in a query plan that is forwarded to a query processor for optimization and execution of the query at the query processor.

According to an aspect of the invention, the enhanced relational algebra operations include nested table abstraction operations. Such operations may include, for example, a row nesting operation, a nested table expansion, a nested row expansion, and a nested row descendant expansion.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 4 shows an exemplary XML schema in accordance with the present invention;

FIG. 5 shows exemplary instances of an XML document conforming to an XML schema in accordance with the present invention;

FIG. 7 shows an exemplary abstract syntax tree in accordance with the present invention FIG. 8 shows an exemplary unified tree in accordance with the present invention;

FIGS. 9a and 9b show an exemplary relational tree in accordance with the present invention;

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

1. Exemplary Query Processing Environment

Figure 1:
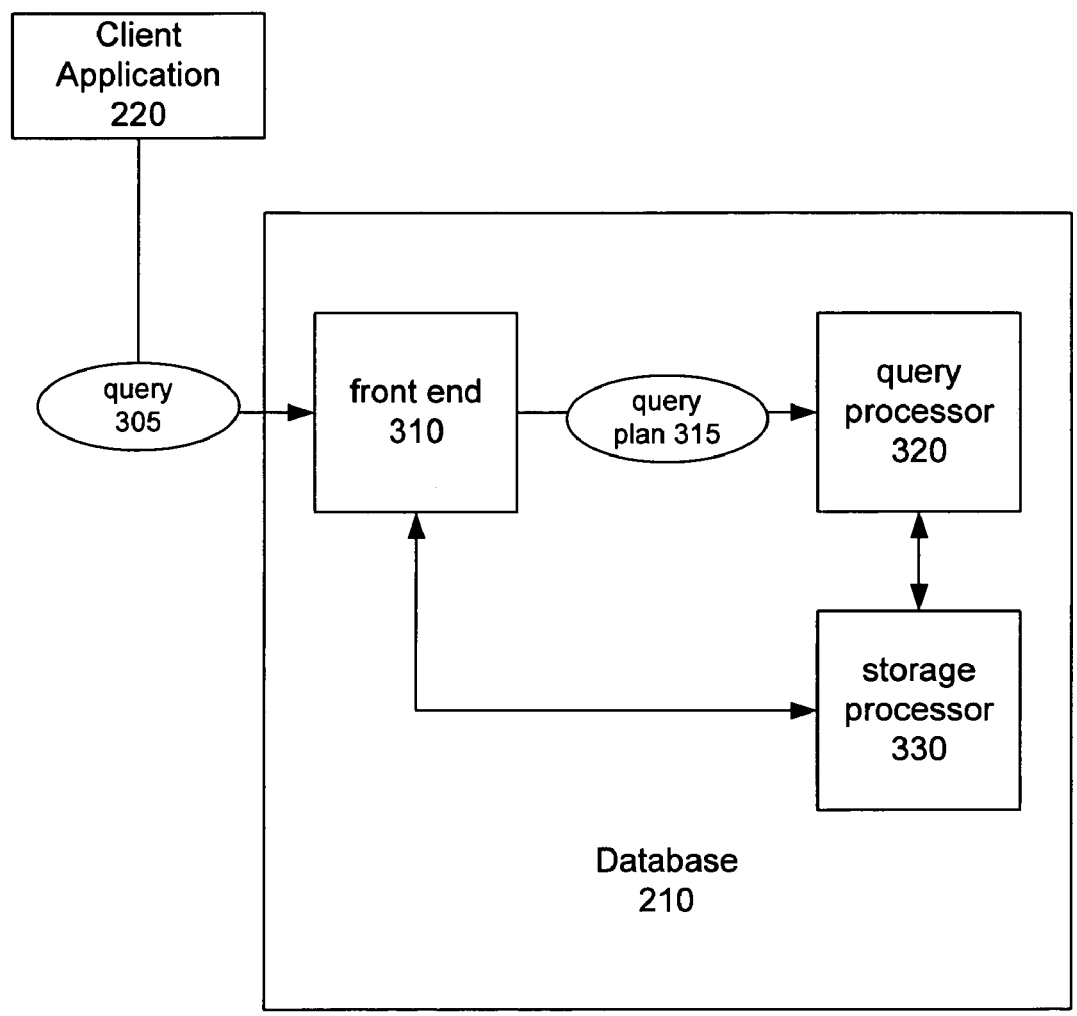
FIG. 1 is a block diagram of an exemplary prior art query processing environment.

An exemplary prior art query processing environment is shown in FIG. 1. Generally, client application 220 submits a query 305 to database 210. The query is then processed at database 210, and results are returned to client application 220.

Database 210 includes database front end 310, query processor 320, and storage processor 330. Database front end 310 receives query 305 from client application 220 and validates query 305. For example, front end 310 may validate that a table referenced by query 305 is a valid table that is present in database 210. Front end 310 may also verify that query 305 has been submitted by an authorized user. Front end 310 also generates a query plan 315 for executing the query 305, which will be discussed in detail below with reference to FIG. 2.

Query processor 320 receives query plan 315 and generates an execution plan based on query plan 315. Query processor 320 may perform an optimization on query plan 315 to determine the optimal manner in which to execute query plan 315.

Storage Processor 330 maintains data in a storage medium. Storage processor 330 also maintains a database schema, which is a hierarchical organization of the data. Essentially, then, storage processor 330 contains the functionality to access the data of database 210 based on a received execution plan from query processor 320.

Figure 2:
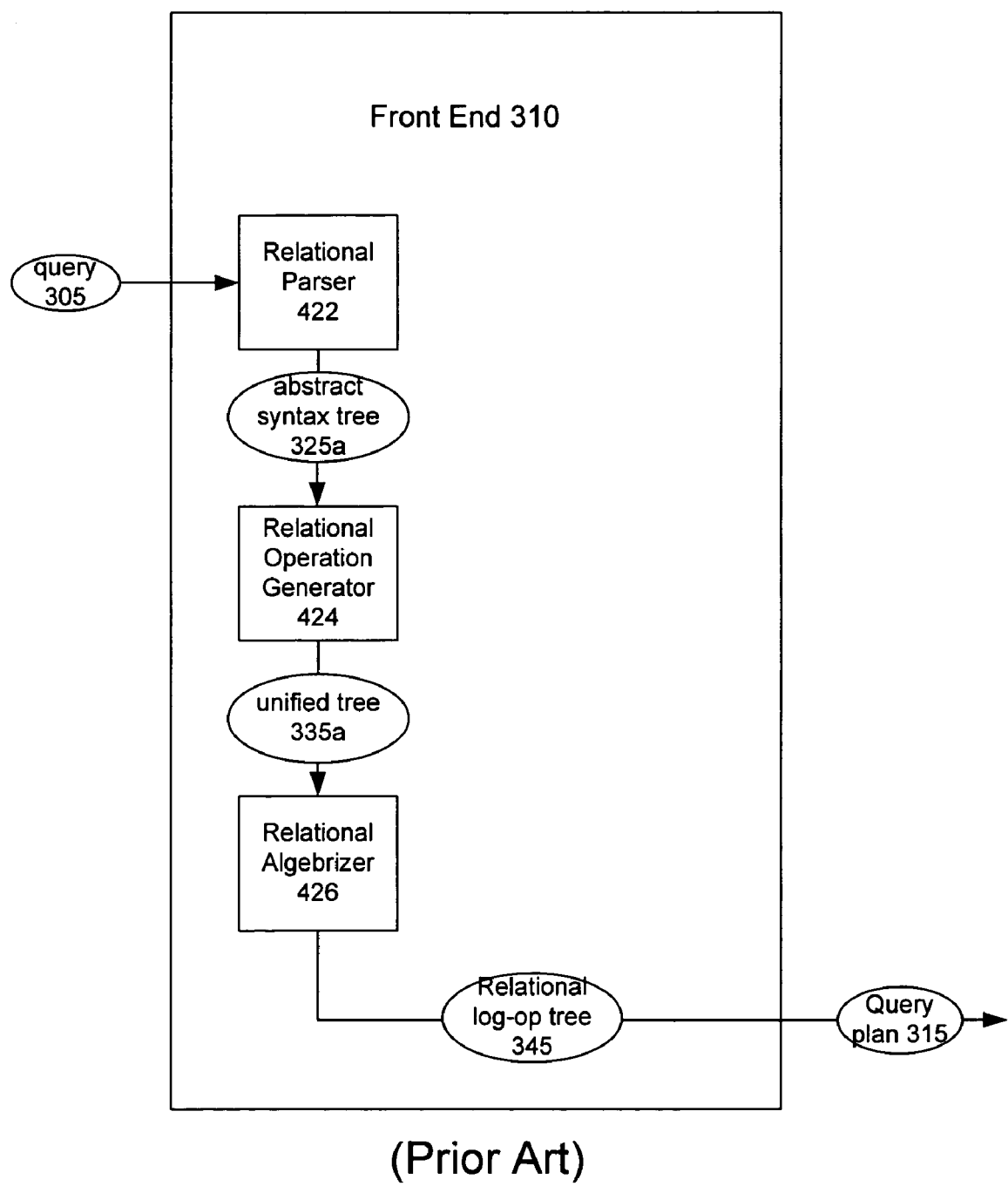
FIG. 2 is a block diagram of an exemplary prior art database front end.

An exemplary prior art database front end 310 is shown in FIG. 2. Generally, front end 310 receives query 305 and generates a corresponding query plan 315, which is submitted to query processor 320 for optimization and execution. Relational parser 422 parses query 305 to yield an abstract syntax tree 325a. Relational operation generator 424 than transforms the abstract syntax tree 325a into a unified tree structure 335a. The nodes of unified tree structure 335a represent abstract relational operations to be performed for query 305. Algebrizer 426 converts the relational operations in the unified tree 335a to relational algebraic expressions in a log-op tree 345. The log-op tree 345 is the resulting query plan 315, which is submitted to query processor 320.

Figure 3:
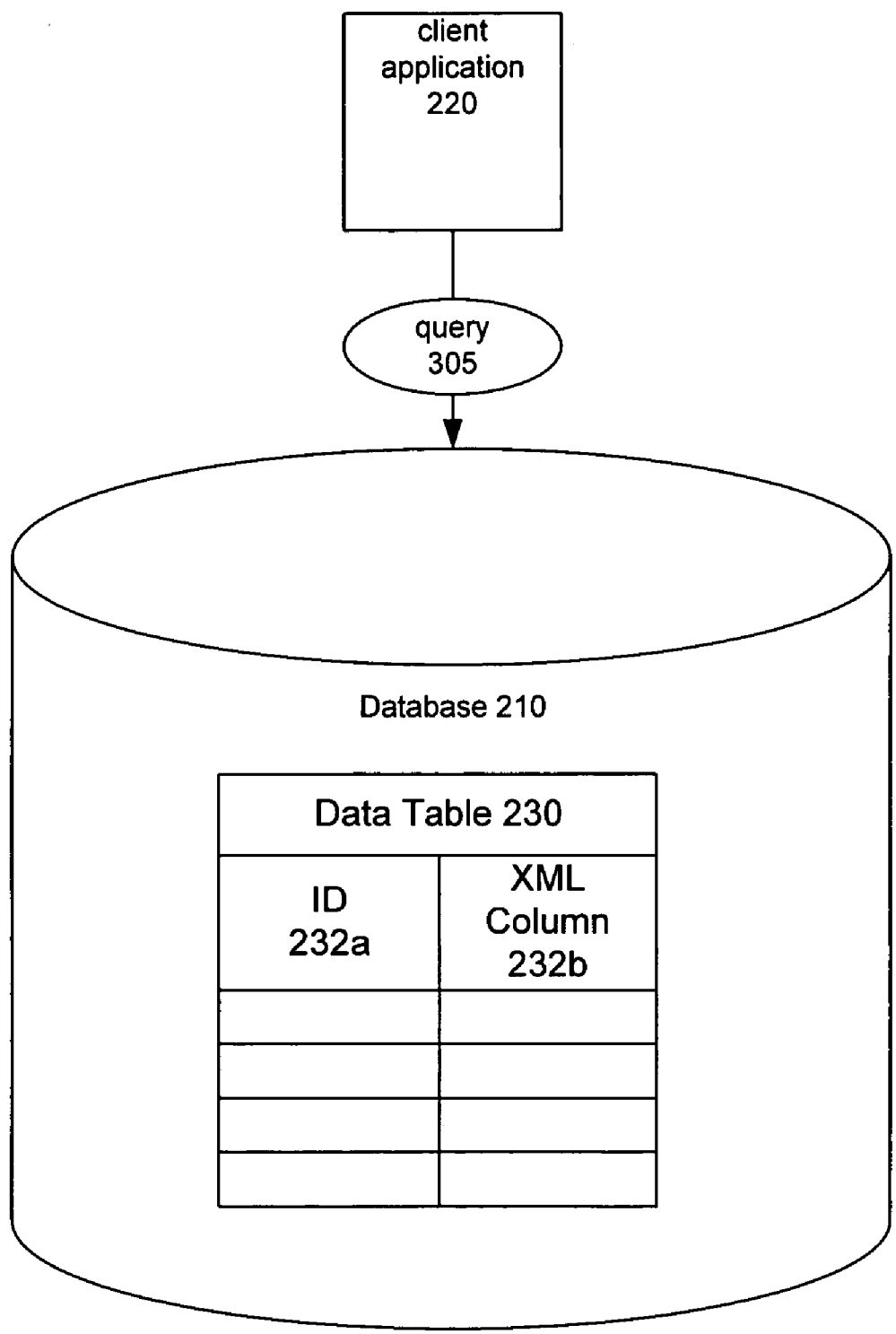
FIG. 3 is a block diagram of an exemplary database in accordance with the present invention.

2. Systems and Methods for Compiling an Extensible Markup Language Based Query As set forth above, the present invention is directed to compiling an extensible markup language (XML) based query. The present invention may be implemented in connection with a database that enables data to be defined using an XML data type, such as database 210 of FIG. 3. Database 210 includes a data table 230 with columns 232a and 232b. Column 232a is a relational column that is the primary key column of table 230 including a unique identifier for each instance of column 232b. As should be appreciated, table 230 may include other relational columns (not shown) in addition to column 232a. Column 232b is an XML column that includes XML data organized according to a hierarchical manner which may include elements, attributes, and text. Table 230 may also include additional XML columns (not shown).

Referring now to FIG. 4, exemplary XML schema 400 shows a hierarchy for "People" data. For each person that is an instance of "People" schema 400, data may be entered for a corresponding name, email address, phone, address, homepage, credit card, and profile and so on as permitted by the XML schema.

Referring now to FIG. 5, document 500 includes data for two instances of "People" schema 400. Each such instance has a corresponding unique identifier that is a value for ID column 232a in FIG. 3.

The XML data in XML column 232b may be searched, retrieved, and updated by submitting to database 210 a query 305 that includes an XML expression. The XML expression may be written in XML query language such as, for example, XQuery, XSLT, or an extension of the SQL language. An exemplary XML expression for retrieving data from "People" data table 230 including XML column 232b with "people" schema 400 is shown below:

```
select p_xmlperson.query('
    declare namespace p="people-uri"
    /p:person[p:profile/p:age>21]/p:name')
from people
```

This query includes one path expression, namely: /p:person[p:profile/p:age>21]/p:name, which contains the paths p:person, p:person/p:profile/p:age, and p:person/p:name. To evaluate the expression, "People" table 230 is filtered on XML column 232b with an age predicate (age>21). The name of each person that satisfies the age predicate is then retrieved.

Figure 6:
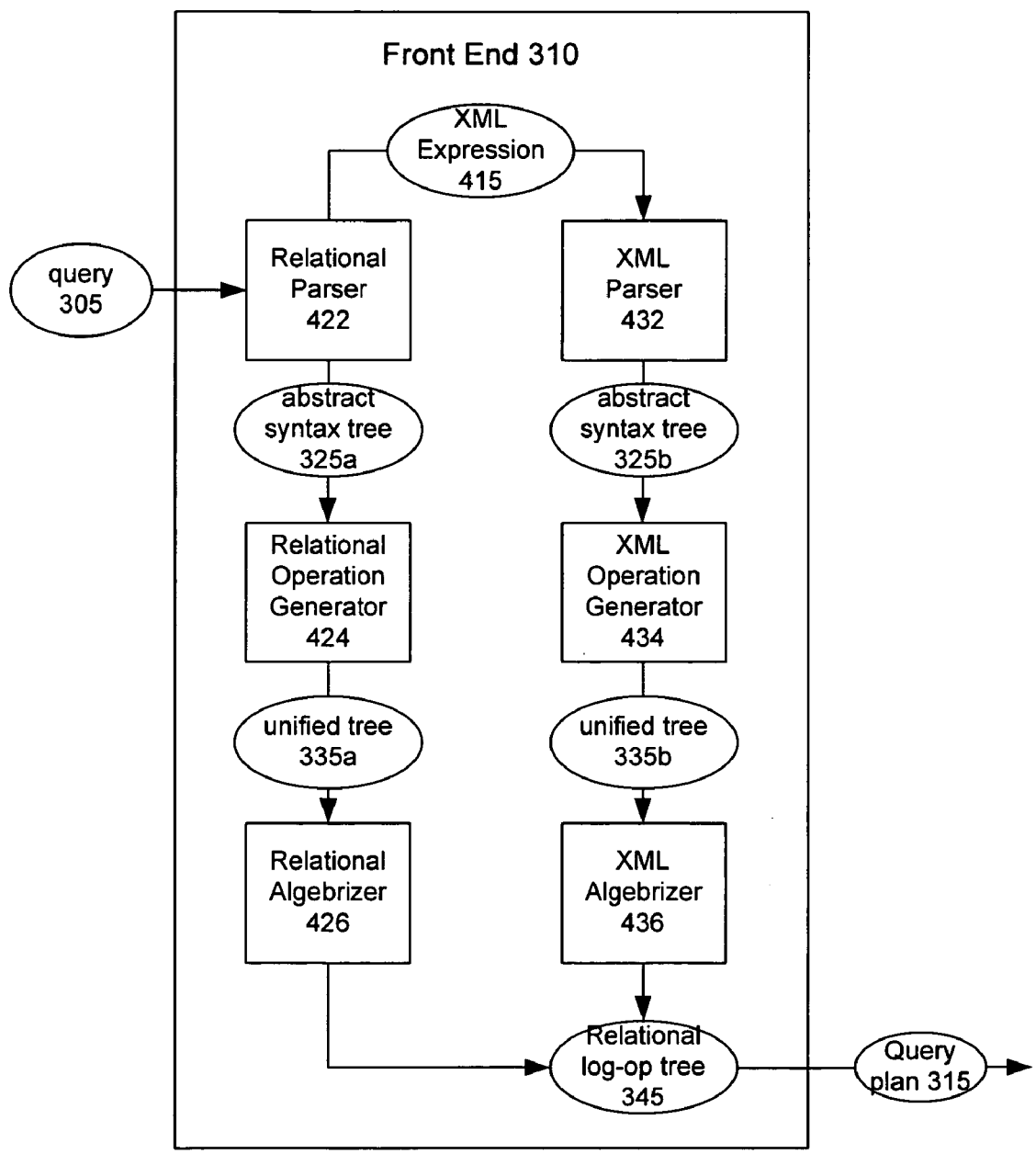
FIG. 6 shows a block diagram of an exemplary database front end in accordance with the present invention.

Referring now to FIG. 6, query 305 including XML expression 415 may be received and manipulated by front end 310 to generate a query plan 315 for executing query 305. In addition to parsing query 305 to yield a relational abstract syntax tree 325a, relational parser 422 passes XML expression 415 from query 305 to XML parser 432. XML parser 432 than parses XML expression 415 to generate an XML abstract syntax tree 325b.

Referring now to FIG. 7, exemplary XML abstract syntax tree 325b is a bound abstract syntax tree that corresponds to exemplary XML expression 415 above. The process of generating abstract syntax tree 325b is well known in the art and will not be described in detail herein.

XML operation generator 434 transforms the XML abstract syntax tree 325b into an XML unified tree structure 335b. Unlike relational operation generator 424, XML operation generator 434 employs a set of XML operations corresponding to XML algebraic expressions.

XML operation generator 434 recursively traverses abstract syntax tree 325b. For each node of abstract syntax tree 325b, a corresponding unified sub-tree is generated. Each such unified sub-tree includes a number of XML algebra operations required to perform the expression in its associated abstract syntax tree node. The unified sub-trees are then inserted into unified tree 335b.

Referring now to FIG. 8, exemplary unified tree structure 335b corresponds to the exemplary XML expression shown above. Tree structure 335b includes a number of XML operations, which are discussed in detail within the "XML Operation Generation" section below.

XML Algebrizer 436 converts the XML operations within unified tree structure 335b into a relational log-op tree 345 that includes enhanced relational operations. XML Algebrizer 436 recursively traverses unified tree 335b. For each node of unified tree 335b, a corresponding relational sub-tree is generated. Each such relational sub-tree includes a number of enhanced relational algebra operations required to perform the XML algebra operation in its associated unified tree node. The relational sub-trees are then inserted into relational tree 345.

Referring now to FIGS. 9a and 9b, exemplary relational log-op tree 345 corresponds to the exemplary XML expression shown above. Tree structure 345 includes a number of enhanced relational operations, which are discussed in detail within the "XML Algebrization" section below.

a. XML Operation Generation

Figure 10:
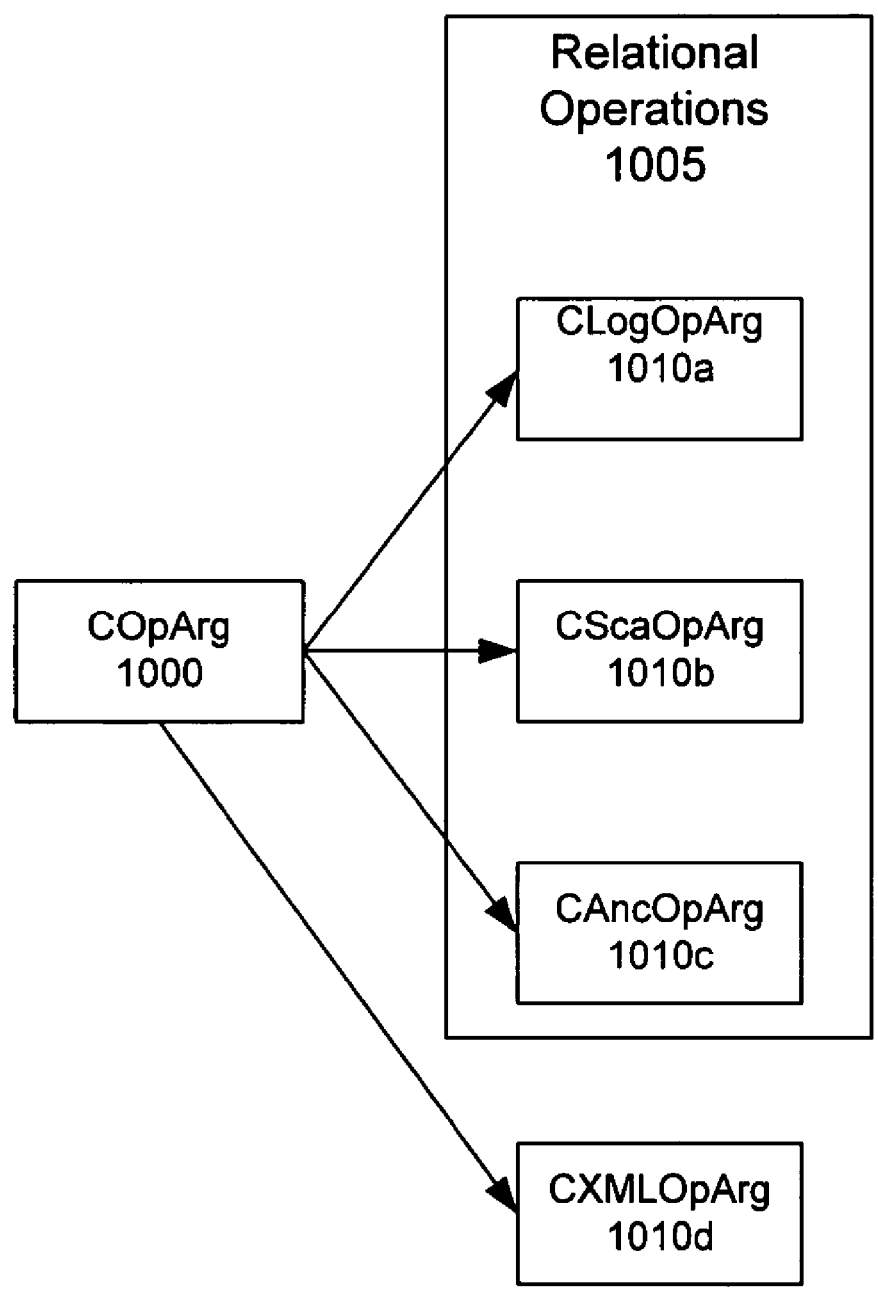
FIG. 10 shows an exemplary interface class of algebra operations in accordance with the present invention.

XML operation generator 434 transforms the XML abstract syntax tree 325b into an XML unified tree structure 335b including XML algebra operations. Referring now to FIG. 10, the set of operations "COpArg" 1000 includes a set of relational operations 1005 employed by relational algebra generator 424. "CXMLOpArg" 1010d is added to "COpArg" 1000. "CXMLOpArg" 1010d is the set of XML operations employed by XML operation generator 434. "CXMLOpArg" 1010d includes a number of operations, which are discussed in detail below. Each such operation may accept input such as, for example, an ordered XML node list, an unordered XML node set, a Boolean condition, an ordinal condition, a node list condition, and other scalar input.

CXmlOp_Follow is an operation that takes an XML node list as input, and returns a following XML node list as output. The types of following node lists which are output may be, for example: children ("/"), which are followed from a parent to the children; descendants ("//"), which are followed from an ancestor to the descendants; a parent (".."), which is followed from a child to the parent; a self node ("."); and an identifier reference (IDREF), ("->"), which is a reference to a corresponding node.

When a child or a descendant follow is performed, a "target" may be set. The target restricts the output list of XML nodes. For example, "a/b" sets the target as "b", so that the output list is restricted to sub-elements with name "b". A target can be elements, attributes, or PCDATA. When an IDREF follow is performed, the source node already contains the name of the referred node. Accordingly, the target restriction is only used for re-validation of an IDREF follow.

In addition to a target, a follow operation may include a flag that provides detail as to how the follow is to be applied. Such flags may include, for example, an all elements flag and a relative flag. An all elements flag indicates that the target of the follow is all elements. The all elements flag does not require string comparison. A relative flag may be employed when a follow does not have a specified input such as, for example, in the case of predicates in XPath expressions. For example, in a[b="c"], the predicate operator takes "a" as one input, and "follow ='b'" as another input for the condition. The follow operator sets the target as "b", but the target is not bound to any input until the predicate operation is evaluated. The actual input is the left child of its nearest predicate above it in the unified tree. If that child is also a relative follow operator, then the next child above it is evaluated until an XML node list is found. Thus, a predicate defines the context for relative follow operators below it.

The relative flag may also be employed to express a nested follow that is not to be evaluated from left to right. For example, "a/b/c" is normally expressed as "(a/b)/c". However, if "a/b/c" is specified as "a/(b/c)", then "b/c" is evaluated first, and, since "b" is not bound, it is expressed as a relative follow.

The list of output nodes is ordered according to the order of input nodes. Output nodes that are generated from different input nodes are ordered in the same order of input nodes, while output nodes that are generated from the same input node are ordered in the global document order.

XmlOp_Follow is an operation that represents XPath axes. The input of this operator is one node, and the output is a list of nodes following the axis. The follow types may include, for example, child, self, descendant, descendant-or-self, parent, ancestor, ancestor-or-self, following-sibling, preceding-sibling, following, preceding, and IDREF.

CXmlOp_Select is an operation that takes a list of ordered XML nodes as a left child and a condition as right child, and returns the qualifying input nodes based on the given condition in their input order. The "select" operator can have three types of conditions: Boolean, ordinal or XML nodes.

The Boolean condition is usually expressed as a comparison of an XML node and some constant. The XML node can be the list output of a relative "follow" operation, meaning that the XML node is evaluated based on the input XML node of the "select" operation such as, for example, the list of 'a' nodes in "/a[b=3]". The XML node can also be evaluated regardless of the current node such as, for example, "/a[/b=6]". The condition means that the current XML node "a" on which the "select" operation is working must have at least one XML node "b" with which the given relationship is present. The given condition must also be satisfied.

The ordinal condition can be either an integer or a list of integers such as, for example, "/a[2]". The condition means that the XML nodes "a" corresponding to the "select" operation must be in one of the given positions among its siblings (i.e. position 2).

This XML node list implies checking for existence, which means that the current XML node on which the "select" operation is working must have at least one XML node with which the given relationship is present. An example is the XPath expression "/a[b]".

CXmlOp_Get is an operation that is used to read an XML source. CXmlOp_Construct creates a new XML node.

CXml_OpConstruct is an operation that can create all types of XML nodes, namely: elements, attributes, processing instructions, comments, and PCDATA. For an element, the operator takes input, which gives the sub-nodes (attributes and/or children) and indicates the order among the attributes. For an attribute, the operator takes a constant (integer, float, string, etc.) as the input, and creates an attribute with the value as the input constant as the value. For PCDATA, the operator takes a string as the input, and creates a PCDATA element.

CXmlOp_Concat is an operation that takes two XML node lists as input, concatenates the second list to the end of the first list, and returns the new list. CXmlOp_Union takes two unordered XML node sets as input, and returns one XML node set which is the union of the two input sets. The union operation is based on node identity.

CXmlOp_Except is an operation that takes two unordered XML node sets as input, and returns one XML node set, in which each node exists in the first set but doesn't exist in the second set.

CXmlOp_Intersect is an operation that takes two unordered XML node sets as input, and returns one XML node set, in which each node exists in both of the input node sets.

CXmlOp_Filter is an operation that takes two XML node lists as input, and returns copies of some of the nodes in the forest represented by the first node list, while preserving their hierarchic and sequential relationships. The nodes that are copied into the result are those nodes that are present at any level in the first operand and are also top-level nodes in the forest represented by the second node list.

CXmlOp_If is an operation that takes two XML node lists and a condition as input, and, if the condition is satisfied, returns the first node list. If the condition is not satisfied, the operation returns the second node list.

CXmlOp_OrderBy is an operation that takes two XML node lists as input. One node list is the list of nodes to be sorted. The other node list includes only one node, which is evaluated within the context of the individual nodes to be sorted. The sorting can be either ascending or descending.

CXmlOp_Before is an operation that is used to search for information by ordinal position. It operates on two lists of nodes and returns those nodes in the first list that occur before at least one node of the second list in document order.

CXmlOp_After is an operation that is used to search for information by ordinal position. It operates on two lists of nodes and returns those nodes in the first list that occur after at least one node of the second list in document order.

CXmlOp_Var is an operation that is used to refer to a declared node variable. CXmlOp_Var has no input. It has a "name" property which is that of the node variable. CXmlOp_Var is normally used as the right child of CXmlOp_Apply.

CXmlOp_Apply is an operation that takes two XML node lists as input, and returns one node list. It has an "apply name" property whose value is the name of the variable bound by a corresponding FOR clause in XQuery. The variable is bound to each of the nodes in a first node list. A second node list may contain references to this variable.

CXmlOP_Insert is an operation that takes two inputs. The first input is an XML node list, which has only one node. The second input can be either an ordered XML node list or an unordered XML node set. The operation inserts a copy of the node in the first list to some position related to the node in the second list or set. The insertion can have three types: INTO, BEFORE, or AFTER. The insertion doesn't have output. For an INTO type, a copy of the node in the first list is inserted as a direct descendent for each of the nodes N of the second list or set. If there are already children for such a node N, then the inserted node is appended to the existing list of children if they are ordered, or otherwise inserted into the unordered children collection of N. For BEFORE or AFTER types, a copy of the node in the first list is inserted directly after or before each of the nodes of the second list. The second input must be an ordered XML node list.

CXmlOp_Delete is an operation that takes an XML node list as input, and deletes all the nodes in the list.

CXmlOp_Replace is an operation that takes two XML node lists as input. Each node in the first list is replaced with a copy of the node in the second list. The replaced node's position is preserved. As part of the replacement, the old node including its subtrees is deleted. If the second list results in an empty sequence, then the nodes in the first list are deleted. If the second list results in more than one node, then an error is returned.

XmlScaOp_Accessor is an operation that has no input, meaning that it refers to the context node, or current node which can be determined. The operator returns the scalar value of specific properties of XML nodes. Such properties may include, for example, name, nodetype (element, attribute, text, comment, processing instruction), position, and data.

XmlScaOp_Function is an operation that represents a built in function that returns a scalar. The inputs are the parameters of the function and the output is the result of the function as a scalar.

XmlOp_Function is an operation that represents a built in function that returns XML nodes. The inputs are the parameters of the function and the output is the result of the function as a list of nodes. For XPath expressions, a function NameTypeCheck may be defined. The function has 3 inputs: a list of nodes, a string (name), or an integer (type). The output is a list of nodes that have the requested name and type.

XmlOp_XmlNode is an operation that keeps the context node in addition to a bound variable.

b. XML Algebrization

XML Algebrizer 436 converts the XML operations within unified tree structure 335b into a relational log-op tree 345. Conventional relational algebra operations are inadequate to describe XML operations which access hierarchical data. Accordingly, XML algebrization in accordance with the present invention converts XML operations into enhanced relational algebra operations.

Enhanced relational algebra operations in accordance with the present invention may include one or more nested table abstraction operations. Such nested table abstractions may include, for example, a GbAgg operation that nests a set of rows into an existing row, thereby creating a parent/child relationship between the existing row and the nested rows; an UNNEST operation that expands a nested table; an UNNEST* operation that expands all levels of nesting for an existing nested row; and a FLATTEN operation that expands all descendants of an existing nested row.

XML algebrization is described in detail below with respect to an XML expression in the XQuery language. However, an XML expression in accordance with the present invention may also be submitted in other XML query languages such as, for example, XSLT and an extension of the SQL language. XML algebrization of an XQuery expression in accordance with the present invention may be divided into algebrization of XPath expressions, XQuery language constructs, XQuery built in functions, and data modification constructs.

i. XPath Expressions

An exemplary set of enhanced relational algebra mappings for XPath expressions is shown in Table 1:

TABLE 1

| Path expression | XML Algebra Operation | Enhanced Relational Mapping |
|---|---|---|
| / (Children) | CXMLOp_Follow | UNNEST |
| // (Descendants) | CXMLOp_Follow | UNNEST * (recursive UNNEST) |
| [Predicate] | CXMLOp_Select | EXISTS or SELECT |
| [Ordinal] | CXMLOp_Select | RANK (adds a ranking column that refers to existing position) |
| => (IDREF) | CXMLOp_Follow | JOIN |

The slash operator "/", yielding the children of a node, maps directly to an UNNEST operation. Predicate evaluation is performed within the WHERE clause of a SELECT or by checking whether a row exists that satisfies the predicate. The Ordinal operation adds a ranking column for ordering. Following an IDREF is converted into a JOIN between origin and destination XML nodes.

An exemplary enhanced relational mapping of /a//b is:

SELECT b* FROM UNNEST* (a, b).

An exemplary enhanced relational mapping of /x/a [P=5], where P is an element, is:

SELECT a. * FROM UNNEST (x, a) as $b,
WHERE EXISTS (SELECT * FROM UNNEST ($b, P) WHERE P.Value = 5)

ii. XQuery Language Constructs a. if/then/else

An exemplary set of enhanced relational algebra mappings for XQuery language constructs is shown in Table 2:

TABLE 2

| XQuery expression | XML Algebra Operation | Enhanced Relational Mapping |
|---|---|---|
| WHERE | CXMLOp_Select Assemble elements | SELECT FLATTEN |
| if test_expr then expr1 else expr2 | | CLogOp_Union(all) CLogOp_Select expr1 CScaOp_Exists test_expr CLogOp_Select expr2 CScaOp_NotExists test_expr |
| Some $v in e1 satisfies e2 | | CScaOp_Exists CLogOp_Select e1 e2 |
| Every $v in e1 satisfies e2 | | CScaOp_NotExists CLogOp_Select e1 not(e2) |
| Construct | CXMLOp_Construct | PROJECT and UNION_ALL |
| Concat (comma) | CXMLOp_Concat | UNION_ALL |
| FOR | CXMLOp_Apply | Variable binding (FROM clause) or APPLY |
| FOR (only Path expression in binding) | CXMLOp_Apply | APPLY |
| FOR (Path Construct/ Concat in binding) | CXMLOp_Apply | APPLY, ClogOp_Spool and CLogOp_Sequence |
| LET (Path Construct in binding) | CXMLOp_Let | CLogOp_Spool and CLogOp_Sequence (common subexpression spool) |

With respect to the if/then/else expressions, a "Switch Union" operation may be employed to simplify the mapping. The Switch Union operation chooses one of many children in accordance with a scalar.

With respect to the LET expression, LET is best understood as a sub-expression such as shown below:

```
LET $var = expression1($v1, $v2, . . . )
    RETURN expression2($var, $v1, $v2, . . . )
```

Expression1 may be effectively assigned to $var, and expression2 can refer to this variable any number of times. In addition, both expressions can depend on variables defined by outer expressions.

Two exemplary implementations for converting a LET expression are described below. The implementation plans depend on a GbAgg(nest)/unnest operation and to a lesser extent on exposing the Common Subexpression Spool (CLogOp_Spool) as an input operator.

Figure 11:
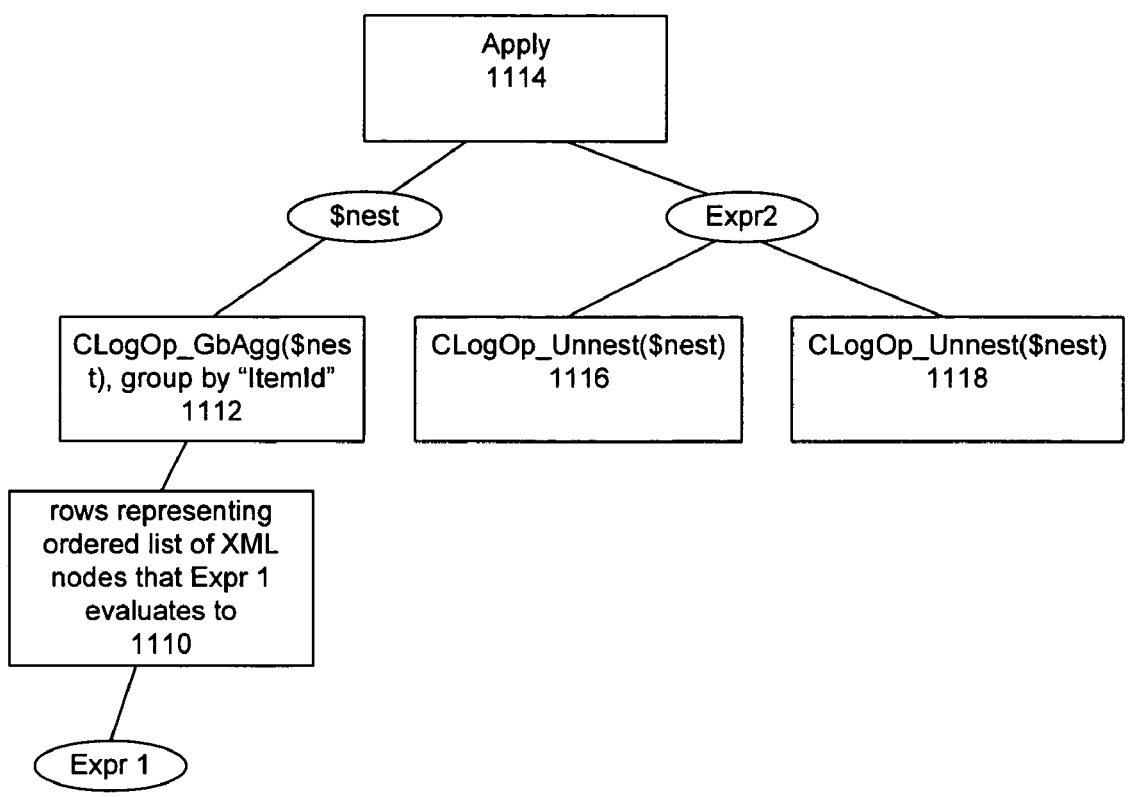
FIG. 11 shows an exemplary algebrization of a LET expression in accordance with the present invention.

The first exemplary implementation involves the use of simple nested table algebra. It leaves the choice of whether to re-execute or spool nested sub-expressions to query processor 320, which is appropriate given that this is a cost-based decision. An exemplary enhanced relational mapping for an exemplary LET expression under the first implementation is shown in FIG. 11. The LET expression is of the following form:

```
LET $v=Expr1

RETURN Expr2
```

Steps 1110-1118 show that, as part of "Expr1", an item identifier ("ItemId") is manufactured and used by nest as the grouping column. The mapping shown in FIG. 11 assumes that "Expr2" refers to $v in two places.

Figure 12:
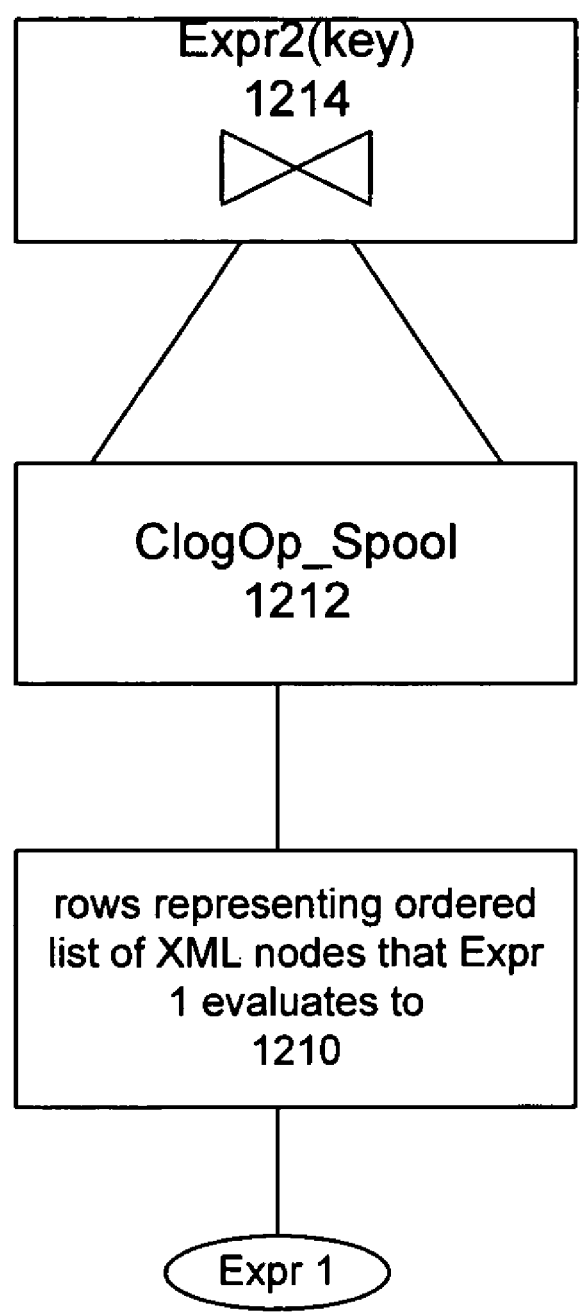
FIG. 12 shows another exemplary algebrization of a LET expression in accordance with the present invention.

The second exemplary implementation is based on exposing CLogOp_Spool to XML algebrizer 436. An exemplary enhanced relational mapping for the exemplary LET expression above under the second implementation is shown in FIG. 12. Steps 1210-1214 show that an "ItemId" is employed to distinguish multiple different groups of XML nodes flowing into the same spool.

The conversion of the LET expression may be applied in situations other than user specified queries. For example, arbitrary expressions in FOR-bindings and ORDER-BY expressions are query transforms that enable implementations for other XQuery constructs. The two exemplary queries below illustrate how arbitrary expressions in a FOR-binding may involve the LET expression. The two exemplary queries are semantically equivalent, but suggest different execution plans:

```
FOR $b in expr1
    RETURN expr2($b)
LET $b1 = expr1
    FOR $b in $b1
        RETURN expr2($b)
```

The second version can be mapped even if expr1 is not subject to reference semantics such as, for example, in the case of path expressions. The second query is advantageous because it isolates the copy via the LET expression and then has the FOR operation refer to this copy.

The Order-by expression can be converted to reference semantics in a similar fashion as shown below:

```
<a><b> { /x/c[2] } </b><b> { /y/c[3] } </b></a> ORDER-BY a/b/c
to
LET $e = <a><b> { /x/c[2] } </b><b> { /y/c[3] } </b></a>
    $e ORDER BY a/b/c
```

As shown in the examples above, conversion of the LET expression may be applied in situations other than user specified queries.

iii. Data Modification

An exemplary set of enhanced relational algebra mappings for data modification constructs is shown in Table 3:

TABLE 3

| Modification | XML Algebra Operations | Enhanced Relational Mapping |
|---|---|---|
| INSERT | CXMLOp_Insert | CLogOp_Insert, CLogOp_UDX(re-id/validate) |
| DELETE | CXMLOp_Delete | CLogOp_Delete, CLogOp_UDX(validate) |
| REPLACE | CXMLOp_Replace | 1. For value replace: CLogOp_Update 2. For tree replace: Combination of INSERT and DELETE (may be optimized) |

In addition to the operations shown in Table 3 above, other data modification constructs can be made available as XML algebra operations and converted into enhanced relational mappings. Such additional operations may include, for example, MOVE, RENAME, and UPSERT operations. The MOVE operation combines an INSERT and a DELETE. An UPSERT operation replaces an existing subtree or inserts a non-existing subtree.

An exemplary mapping for the insertion statement "INSERT N AFTER L" is shown below:

```
INSERT (RE-ID (CROSS-PRODUCT
            (APPLY (L, Children (Parent (L)))
            (FLATTEN (N))))
```

An alternative mapping is shown below:

```
INSERT (APPLY (L,
        RE-ID (UNION (Children (Parent (L),
                              FLATTEN (N)))))
```

The first exemplary mapping above includes the RE-ID user defined expression (UDX) above the APPLY where the RE-ID receives and processes a rowset for all L and the single subtree N. The second exemplary mapping above includes the RE-ID under the APPLY so that FLATTEN (N) is called on all insertion locations, unlike the first plan. Thus, the first mapping is faster than the second.

An exemplary mapping for the deletion statement "DELETE A" is shown below:

```
DELETE (FLATTEN
        (APPLY $b
            (SELECT A)
            (VALIDATE
                (UNION (PROJECT 1, $b)
                       (PROJECT 0, UNNEST (Parent ($b))))))
```

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 13:
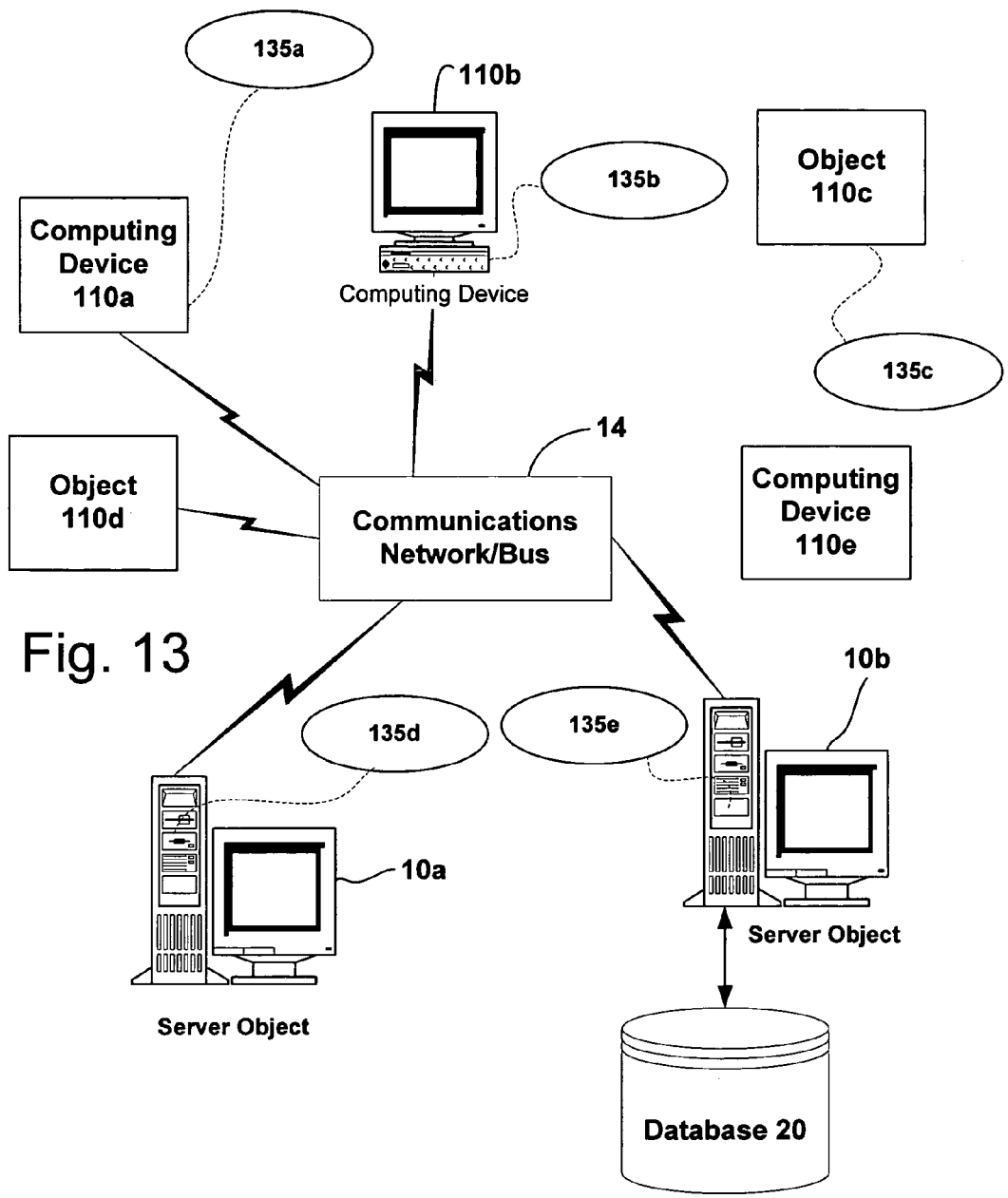
FIG. 13 is a block diagram representing an exemplary network environment having a variety of computing devices in which the present invention may be implemented.

FIG. 13 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, to request use of the processes used to implement the present invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 13, computers 110*a*, 110*b*, etc. can be thought of as clients and computer 10*a*, 10*b*, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 13 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110*a*, 110*b*, 110*c*, 110*d*, 110*e*, etc., such as a portable computer, handheld computer, thin client, networked appliance, orother device, such as a VCR, TV, oven, light, heater and the like in accordance withthe present invention.

In a network environment in which the communications networkibus 14 is the Internet, for example, the servers 10*a*, 10*b*, etc. can be servers with which the clients 110*a*, 110*b*, 110*c*, 110*d*, 110*e*, etc. communicate via any of a number of known protocols such as HTTP. Servers 10*a*, 10*b*, etc. may also serve as clients 110*a*, 110*b*, 10*c*, 110*d*, 110*e*, etc., as may be characteristic of a distributed computing environment.

Communications may be wired or wireless, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof. Each client computer 110*a*, 10*b*, 110*c*, 110*d*, 110*e*, etc. and server computer 10*a*, 10*b*, etc. may be equipped with various application program modules or objects 135 and with connections or access to various types of storage elements or objects, across which files or data streams may be stored or to which portion(s) of files or data streams may be downloaded, transmitted or migrated. Any computer 10*a*, 10*b*, 110*a*, 110*b*, etc. may be responsible for the maintenance and updating of a database, memory, or other storage element 20 for storing data processed according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Figure 14:
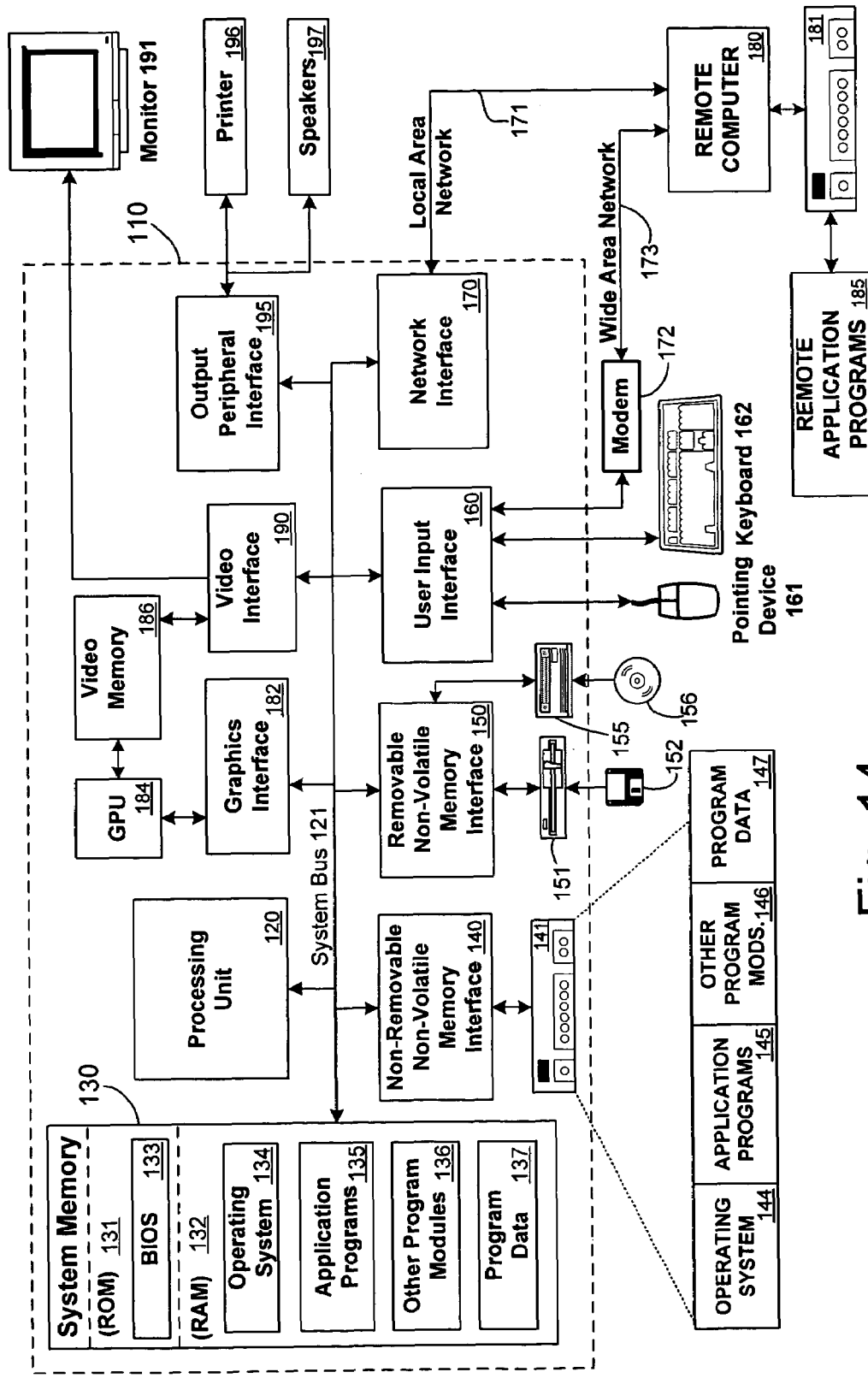
FIG. 14 is a block diagram representing an exemplary computing device in which the present invention may be implemented.

FIG. 14 and the following discussion are intended to provide a brief general description of a suitable computing device in connection with which the invention may be implemented. For example, any of the client and server computers or devices illustrated in FIG. 3 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 14 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 14, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 14 illustrates operating system 134, application programs 135, other program modules 136, and program data 137.

The computer 110 may also include other removable/non-removable, volatile/nonvolatile computer storage media. By way of example only, FIG. 14 illustrates a hard disk drive 141 that reads from or writes to non-removable, nonvolatile magnetic media, a magnetic disk drive 151 that reads from or writes to aremovable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 andoptical disk drive 155 are typically connected to the system bus 121 by a removable memory interface, such as interface 150.

The drives and their associated computer storage media discussed above and illustrated in FIG. 14 provide storage of computer readable instructions, data structures, program modules and other data for the computer 110. In FIG. 14, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 14. The logical connections depicted in FIG. 14 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 14 illustrates remote application programs 185 as residing on memory device 181. It will be appreciated that the network connections shown are exemplary and other means of establishing a communications link between the computers may be used.

CONCLUSION

As the foregoing illustrates, the present invention is directed to systems and methods for compiling an XML query. An extensible markup language (XML) expression included in a query is parsed to yield an abstract syntax tree. The abstract syntax tree is then transformed into a unified tree including XML algebra operations. The unified tree is then converted into a relational tree including enhanced relational algebra operations. The relational tree is then forwarded to a query processor for optimization and execution of the query by the query processor.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for processing a query including an extensible markup language based expression with instructions to modify data that is stored in a node of an extensible markup language schema in a database, the method comprising:
    transforming an abstract syntax tree corresponding to the expression into a unified tree including extensible markup language based algebra operations;
    mapping the extensible markup language based algebra operations in the unified tree to enhanced relational algebra based extensible markup language modification operations in a relational tree; and
    executing the query by modifying data that is stored in the node of the extensible markup language schema in the database in accordance with the relational tree comprising the enhanced relational algebra based extensible markup language modification operations.

2. The method of claim 1, wherein transforming the abstract syntax tree comprises:
    recursively traversing the abstract syntax tree;
    generating a unified sub-tree for each abstract syntax tree node, the sub-tree including at least one corresponding extensible markup language based algebra operation; and
    inserting the sub-tree into the unified tree.

3. The method of claim 1, wherein mapping the extensible markup language based algebra operations comprises:
    recursively traversing the unified tree;
    generating a relational sub-tree for each unified tree node, the sub-tree including at least one corresponding relational algebra based operation; and
    inserting the sub-tree into the relational tree.

4. The method of claim 1, further comprising parsing the query to yield the extensible markup language based expression.

5. The method of claim 1, further comprising parsing the extensible markup language based expression to yield the abstract syntax tree.

6. The method of claim 1, further comprising generating a query plan according to the relational tree.

7. The method of claim 6, further comprising submitting the query plan to a query processor for execution by the query processor.

8. The method of claim 1, comprising mapping the extensible markup language based algebra operations in the unified tree to enhanced relational algebra based extensible markup language modification operations with nested table abstraction in the relational tree.

9. A computer readable storage medium having computer-executable instructions for performing the steps recited in claim 1.

10. A database engine for processing a query including an extensible markup language based expression with instructions to modify data that is stored in a node of an extensible markup language schema in a database, the database engine comprising:
    a processor;
    an extensible markup language operation generator for transforming an abstract syntax tree corresponding to the expression into a unified tree including extensible markup language based algebra operations;
    an extensible markup language algebrizer for mapping the extensible markup language based algebra operations in the unified tree to enhanced relational algebra based extensible markup language modification operations in a relational tree; and
    a query processor that executes the query by modifying data that is stored in the node of the extensible markup language schema in the database in accordance with the relational tree comprising the enhanced relational algebra based extensible markup language modification operations.

11. The database engine of claim 10, further comprising a relational parser for parsing the query to yield the extensible markup language based expression.

12. The database engine of claim 10, further comprising an extensible markup language parser for parsing the extensible markup language based expression to yield the abstract syntax tree.

13. The database engine of claim 10, wherein the extensible markup language operation generator transforms the abstract syntax tree by recursively traversing the abstract syntax tree; generating a unified sub-tree for each abstract syntax tree node, the sub-tree including at least one corresponding extensible markup language based algebra operation; and inserting the sub-tree into the unified tree.

14. The database engine of claim 10, wherein the extensible markup language algebrizer maps the extensible markup language based algebra operations by recursively traversing the unified tree; generating a relational sub-tree for each unified tree node, the sub-tree including at least one corresponding relational algebra based operation; and inserting the sub-tree into the relational tree.

15. A method for processing a query, the method comprising:
    parsing the query to yield an extensible markup language based expression; and
    generating a query plan for the expression including enhanced relational algebra expressions with a nested table abstraction operation; and
    executing the query based on the query plan by using the nested table abstraction operation to establish a parent to descendent relationship among instances of nodes in an extensible markup language schema without compiling separate lists.

16. The method of claim 15, comprising generating a query plan for the expression including enhanced relational algebra expressions with a nested table abstraction operation that is one of a row nesting operation, a nested table expansion, a nested row expansion, and a nested row descendant expansion.

17. The method of claim 15, wherein generating the query plan comprises:
    parsing the expression to yield an abstract syntax tree;
    transforming the abstract syntax tree into a unified tree including extensible markup language based algebra operations; and
    mapping the extensible markup language based algebra operations in the unified tree to relational algebra based operations in a relational tree.

18. A computer readable storage medium having computer-executable instructions for performing the steps recited in claim 15.

19. A database engine comprising:
    a processor;
    a relational parser for parsing a query to yield an extensible markup language based expression;
    an extensible markup language algebrizer for generating a query plan for the expression including enhanced relational algebra expressions with a nested table abstraction operation; and
    a query processor that executes the query based on the query plan by using the nested table abstraction operation to establish a parent to descendent relationship among instances of nodes in an extensible markup language schema without compiling separate lists corresponding to each of the nodes.

20. The database engine of claim 19, wherein the nested table abstraction operation is one of a row nesting operation, a nested table expansion, a nested row expansion, and a nested row descendant expansion.

21. The database engine of claim 19, further comprising:
    an extensible markup language parser for parsing the expression to yield an abstract syntax tree; and
    an extensible markup language operation generator for transforming the abstract syntax tree into a unified tree including extensible markup language based algebra operations.

22. The database engine of claim 21, wherein the extensible markup language algebrizer maps the extensible markup language based algebra operations in the unified tree to relational algebra based operations in a relational tree.

* * * * *